US007020785B2

(12) United States Patent
Kim et al.

(10) Patent No.: US 7,020,785 B2
(45) Date of Patent: Mar. 28, 2006

(54) METHOD FOR AUTOMATICALLY VERIFYING SECURITY CODE OF COMPUTER SYSTEM OPERATED BY REMOTE CONTROLLER

(75) Inventors: Hong-Sam Kim, Yongin-shi (KR); Byung-Jae Lee, Kyunggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 564 days.

(21) Appl. No.: 09/778,730

(22) Filed: Feb. 8, 2001

(65) Prior Publication Data

US 2001/0020276 A1     Sep. 6, 2001

(30) Foreign Application Priority Data

Mar. 2, 2000   (KR)   ............................. 2000-10443

(51) Int. Cl.
    *H04L 9/00*   (2006.01)
(52) U.S. Cl. ........................ 713/202; 713/310
(58) Field of Classification Search ............. 713/200, 713/202, 310
    See application file for complete search history.

(56) References Cited

U.S. PATENT DOCUMENTS

| 4,754,268 | A | * | 6/1988 | Mori | 345/163 |
| 4,789,983 | A | * | 12/1988 | Acampora et al. | 370/349 |
| 5,189,543 | A | * | 2/1993 | Lin et al. | 398/106 |
| 5,198,806 | A | * | 3/1993 | Lord | 713/200 |
| 5,335,168 | A | * | 8/1994 | Walker | 713/321 |
| 6,002,427 | A | * | 12/1999 | Kipust | 348/156 |
| 6,137,480 | A | * | 10/2000 | Shintani | 345/169 |
| 6,366,957 | B1 | * | 4/2002 | Na | 709/229 |

OTHER PUBLICATIONS

Andy Rathbone, Windows 95 For Dummies, 1997, IDG Books Worldwide Inc, 2nd edition, pp. 167-168.*
Microsoft Press, Microsoft Computer Dictionary, 2002, Fifth edition, p. 478.*
Microsoft Press, Microsoft Computer Dictionary, 1997, Third edition. p. 510.*
The American Heritage College Dictionary, 2002, Houghton Mifflin Company, Fourth Edition, p. 1176.*
Printout from http://msdn.microsoft.com/library/en-us/dnwmt/html/ remote_control.asp?frame=true, entitled "*Using the Remote Control Device with Windows*", Microsoft Corporation, Sep. 2002.
Webster's New World Dictionary Third College Edition 1988, pp 1135 and 1136.

* cited by examiner

*Primary Examiner*—Gregory Morse
*Assistant Examiner*—Jacob Lipman
(74) *Attorney, Agent, or Firm*—Robert E. Bushnell, Esq.

(57) ABSTRACT

A computer system includes a remote controller for generating a remote control signal to remotely control operations of the system, a remote control signal receiver for receiving the remote control signal generated from the remote controller, and a shell program for executing various remote control operations by the remote controller. If a security code verification operation is performed when the computer system returns from a stand-by state to a normal state by the remote controller, the shell program serves to automatically input a security code transmitted from the remote controller. This makes it possible to automatically input a security code that a user must directly input using an input device such as a keyboard, when the computer system returns to the normal state. Therefore, user convenience can be enhanced.

9 Claims, 7 Drawing Sheets

METHOD FOR AUTOMATICALLY VERIFYING SECURITY CODE OF COMPUTER SYSTEM OPERATED BY REMOTE CONTROLLER

This application makes reference to, incorporates the same herein, and claims all benefits accruing under 35 U.S.C. §119 from my application entitled AN AUTOMATIC SECURITY CODE VERIFYING METHOD OF A COMPUTER SYSTEM OPERATED BY A REMOTE CONTROLLER filed with the Korean Industrial Property Office on Mar. 2, 2000 and there duly assigned Serial No. 2000-10443.

BACKGROUND OF THE INVENTION

1. Field of the Invention

The present invention generally relates to a computer system. More specifically, the present invention is directed to a method for automatically verifying a security code of a computer system that is operated by a remote controller.

2. Background of the Invention

A remote controller has widely been used to control operations of various electronic products such as a television, an audio player system, and a video player system. Recently, the remote controller has been used to remotely control operations of a computer system for achieving more expedient user interface.

A recent computer system has a power-saving characteristic, which selectively switches off a main power supplied to a specific component when the system is in an idle state. A conventional power management circuit monitors a keyboard, a mouse, and other system components as a sign of activity. If no activity is found in the system components for a predetermined time, the power management circuit turns off a main supply power, enabling the system to enter a stand-by mode. As a supply power in the stand-by mode, a stand-by power of a low current is supplied to a stand-by power logic circuit. The stand-by power logic circuit serves to enable the system to exit from the stand-by mode in response to a wake-up activity. A specification associated with the power management of the foregoing computer system is disclosed in "Advanced Configuration and Power Interface (ACPI) Specification", Intel, Microsoft, and Toshiba, published on Dec. 22, 1996.

In general, users would set a security code in their computer systems so as to save a power or achieve security. For example, there is a function to verify a security code when the computer system returns from a screen saver state or a power saving mode to a use environment. When a computer system is switched from a stand-by state such as a sleep state to a wake-up state without setting a security code therein, the computer system would meet a problem in a security-needful place. To overcome such a problem on security, operating system (OS) programs such as Microsoft Windows 95 or Windows 98 provide a function to verify a security code when a computer system exits from a stand-by state.

However, if the verify function is performed when the computer system is woke up from the stand-by state, a user must directly input a security code through a keyboard. Even if a remote controller for an expedient user interface is provided, the above controller is inconvenient for the user unless a device/method specifically modified in circuitry/software would be provided in the computer system. So to speak, an advantage of the remote controller for controlling the computer system more conveniently is reduced. In this case, it is impossible to entirely and remotely control the computer system using the remote controller. Therefore, a method of verifying a security code more conveniently is needed when a computer system having a security verify function is controlled by a remote controller.

SUMMARY OF THE INVENTION

It is an object of the present invention is to provide a method of more conveniently verifying a security code of a computer system whose operations are controlled by a remoter controller.

It is also an object to provide a method of verifying a security code or password of a computer whose operations are controlled by any one of a plurality of remote controllers.

It is further an object of the present invention to provide a computer that can receive a password or a security code from a wireless remote control when going from a stand-by state to a normal mode of operation.

It is yet an object of the present invention to provide a computer that has many remote controls from which the computer can accept a password or a security code in order to bring the computer from a stand-by state to a normal mode of operation.

To achieve the above and other objects of the invention, there is provided a method and apparatus of verifying a security code set in a computer system whose operations are controlled by a remoter controller. Security code verify initiation data is generated to initiate a function to verify the set security code therein. When a security code is input to a security verification means, it is checked whether the set security code and the input security code are matched with each other. If matched, an operation state of the computer system is converted into a normal state. When the initiation data is generated by the remote controller, a shell program automatically inputs the input security code to the security verification means.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A new and improved computer system includes a remote controller to generate a remote control signal for remotely controlling the computer system, a remote control signal receiver to receive a remote control signal generated from the remote controller, and a shell program to execute various remote control operations by means of the remote controller. The shell program serves to automatically input a security code transmitted from a remote controller, if a security verify operation is carried out when the computer system goes from a stand-by state to a normal state by the remote controller. Therefore, a security code input operation is automatically carried out to enhance convenience of a user.

First Embodiment

Figure 1:
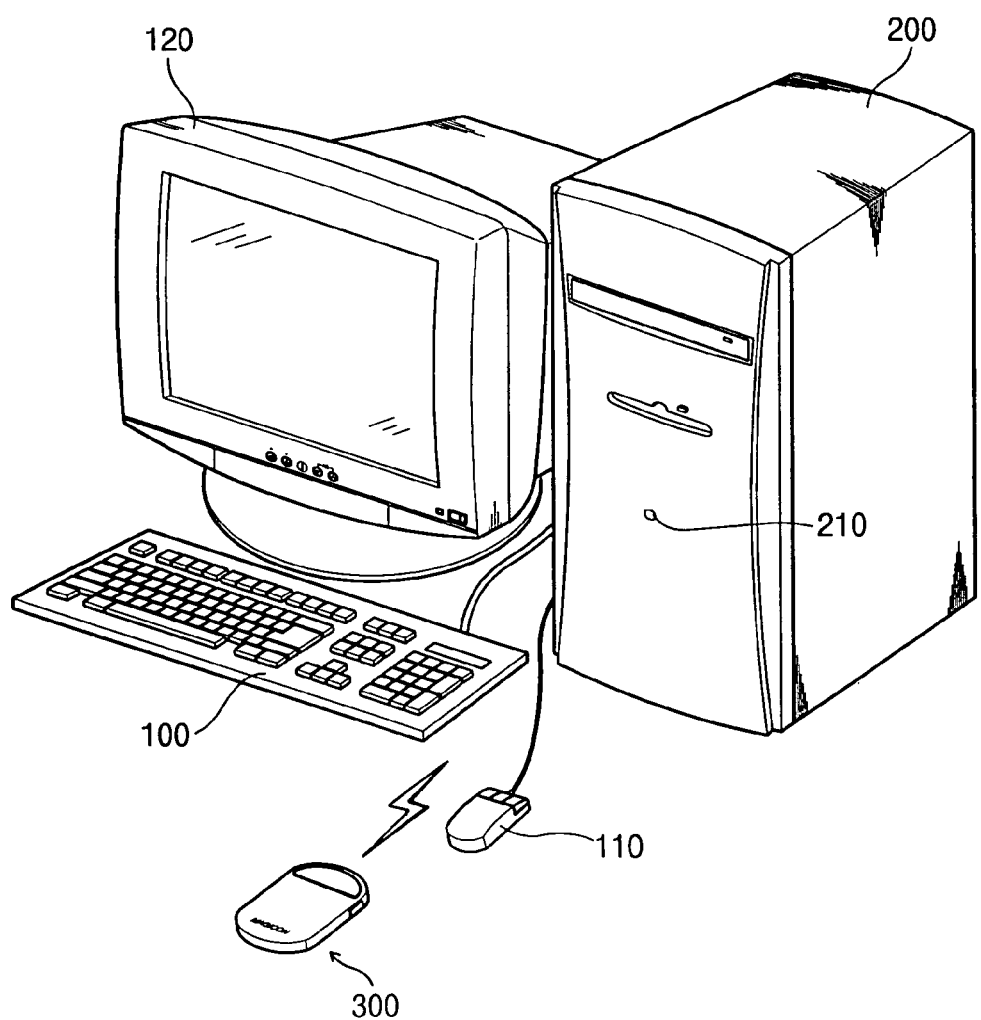
FIG. 1 is a perspective view showing an appearance of a computer system having a remoter controller in accordance with a first embodiment of the present invention.

An appearance of a computer system having a remote controller is shown in FIG. 1. And, a construction of the computer system including a remote controller and a remote control signal receiver is schematically shown in FIG. 2.

Figure 2:
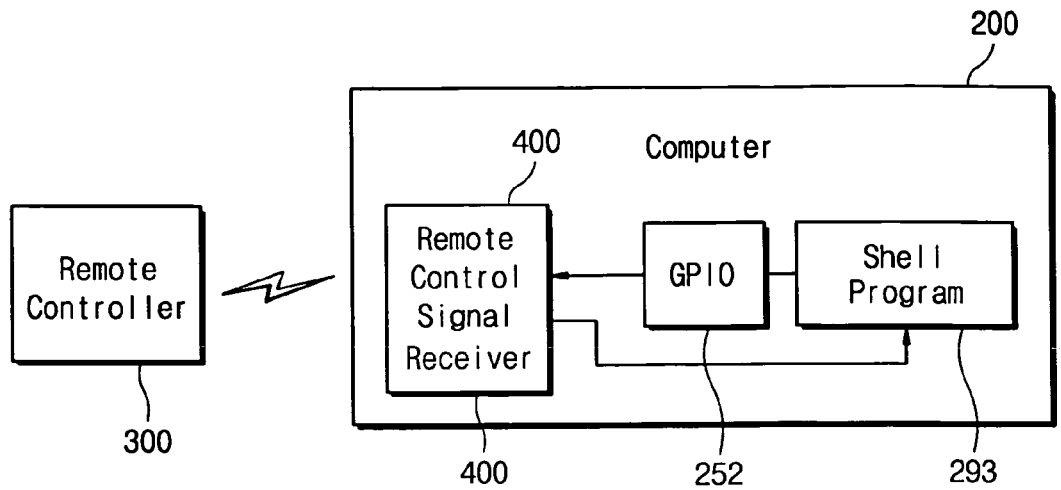
FIG. 2 is a block diagram showing a circuit construction of a computer system including a remote controller and a remote control signal receiver shown in FIG. 1.

Referring to FIG. 1 and FIG. 2, a computer system 200 can be driven by a power switch 210 of a computer, and can remotely be driven by a remote controller 300. In other words, a remote control signal generated from the remote controller 300 is transmitted to a remote control signal receiver 400 embedded in the computer system 200, controlling operations of the computer system 200. The receiver 400 is coupled to a general purpose IO (GPIO) 252 mounted in a PCI-to-ISA bridge 250 (see FIG. 5) and a shell program 293. The GPIO 252 serves to transmit state information of the computer system 200 from the shell program 293 to the receiver 400. The receiver 400 receiving the state information carries out a power-related remote control through a power supply 280 (see FIG. 5) and a system power management 251 (see FIG. 5) coupled to a power switch 210 (see FIG. 5).

Particularly, the remote controller 300 and the remote control signal receiver 400 associated therewith have an identical security code for verifying an authentic user. The remote control signal generated from the remote controller 300 is transmitted together with the security code. Only when these security codes are matched with each other, the computer system 200 can remotely be controlled by the remote controller 300.

Figure 3:
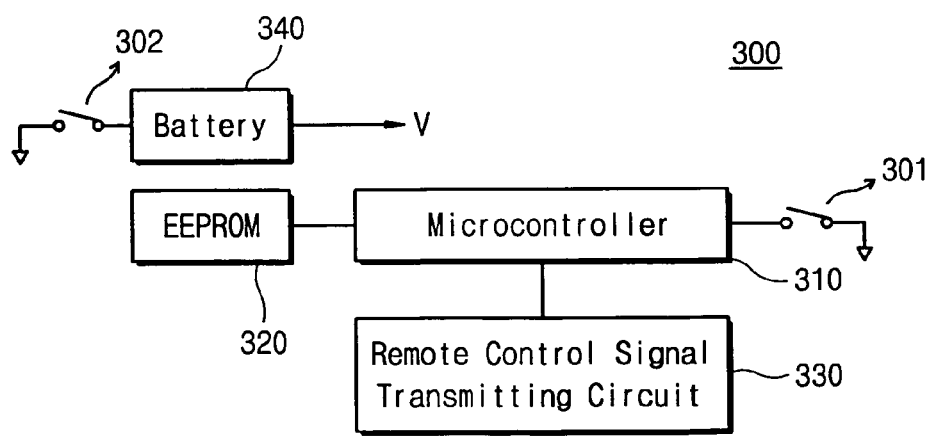
FIG. 3 schematically shows a circuit construction of the remoter controller shown in FIG. 2.

A circuit construction of the remote controller 300 shown in FIG. 2 is schematically shown in FIG. 3. The remote controller 300 includes an EEPROM 320 for storing a security code, a microcontroller 310 for generating a computer remote control instruction, a remote control signal transmitting circuit 330 for transmitting the instruction to the receiver 400, and a battery 340 for supplying an operating power of the remote controller 300. The microcontroller 310, which is coupled between the EEPROM 320 and the transmitting circuit 330, serves to generate a remote control instruction and control sequential operations for transmitting the instruction through the transmitting circuit 330. Microcontroller 310 is connected to ground when switch 301 is closed and battery 340 is connected to ground when switch 302 is closed.

Figure 4:
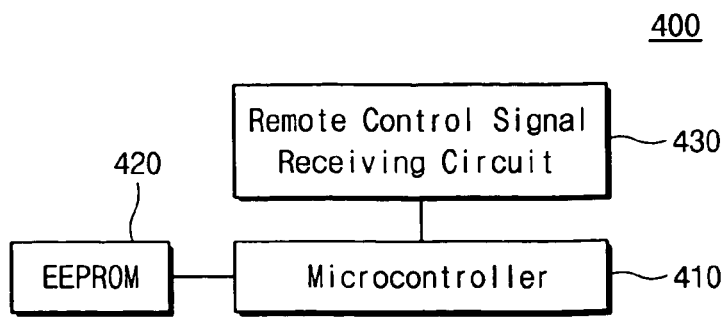
FIG. 4 schematically shows a circuit construction of the remote control signal receiver shown in FIG. 2.

A circuit construction of the remote control signal receiver 400 is schematically shown in FIG. 4. The remote control signal receiver 400 includes an EEPROM 420 for storing a security code, a remote control signal receiving circuit 430 for receiving a remote control instruction from a remote controller, and a microcontroller 410 coupled between the EEPROM 420 and the receiving circuit 430. The microcontroller 410 receives a remote control instruction, and checks whether a security code of the remote controller 300 is matched with that stored in the EEPROM 420. If matched, the microcontroller 410 controls the remote control instruction to be executed.

Figure 5:
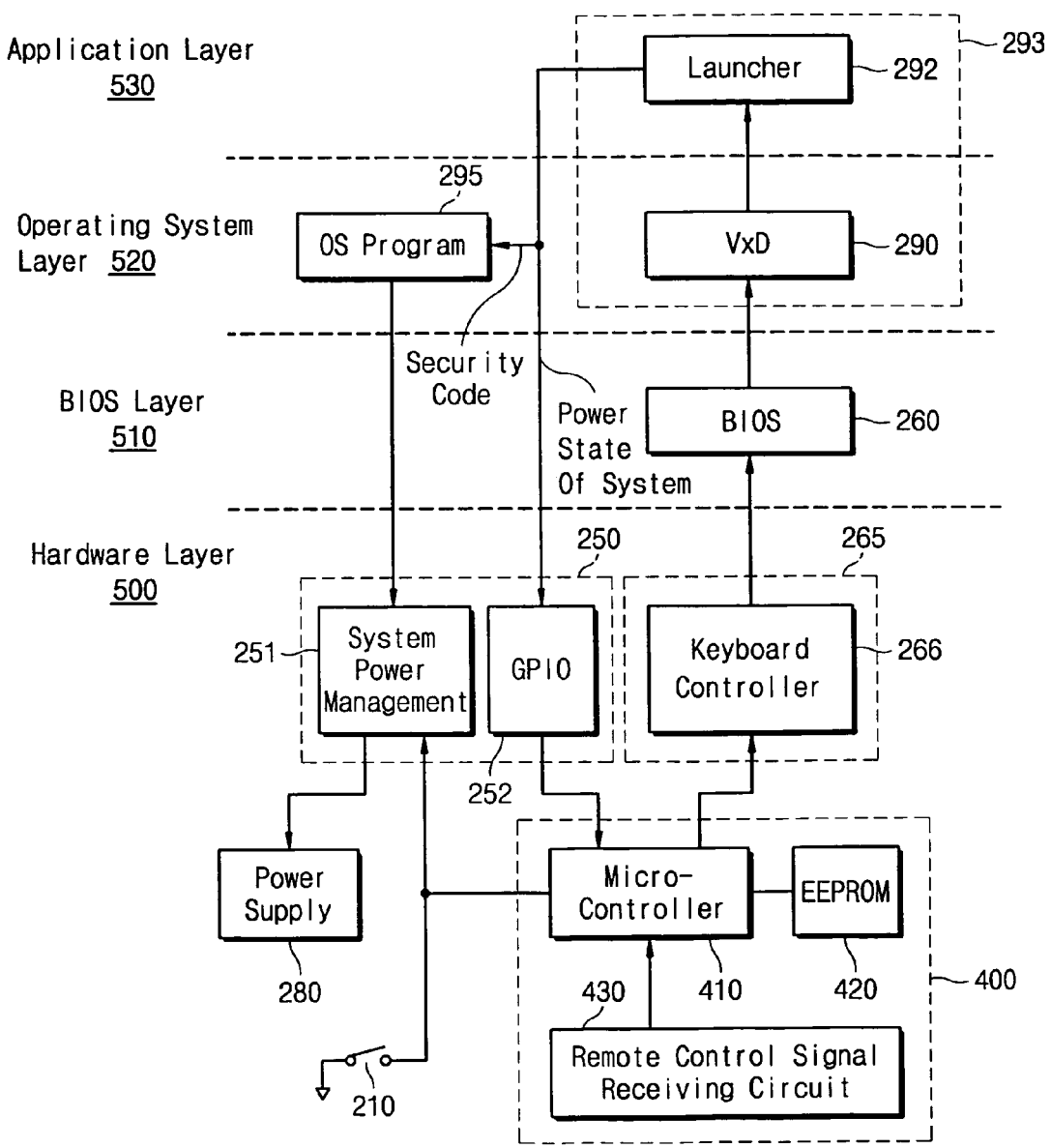
FIG. 5 hierarchically shows a software and hardware construction of the computer system shown in FIG. 2.

A hardware/software construction of the computer system 200 shown in FIG. 2 is hierarchically shown in FIG. 5. The computer system 200 has a hierarchical structure that is composed of a hardware layer 500, a BIOS layer 510, an operating system layer 520, and an application layer 530.

The hardware layer 500 includes a PCI-to-ISA bridge 250, a super I/O 265, and a remote control signal receiver 400. The PCI-to-ISA bridge 250 is roughly composed of a system power management 251 and a GPIO 252. A power supply 280 and a power switch 210 are commonly coupled to the system power management 251. A keyboard controller 266 resides in super I/O 265 in hardware layer 500.

The BIOS layer 510 includes a basic input/output system (BIOS) 260. The operating system 520 includes an operation system program 295 such as Microsoft Windows 95 or Windows 98, and a virtual keyboard driver VxD 290. The application layer 530 includes a shell program 293 composed of the VxD 290 and a launcher 292 serving to automatically execute a program. Functions performed by the shell program 293 are previously stored in a specific area of the BIOS 260.

If a security code is set in a computer system for power saving or security and a function to verify the security code when a computer exists from a stand-by state to a normal state is provided to the system, the shell program 293 directly transmits a security code, which is transmitted from a remote controller 300, to an OS program 295. As a result, although a user does not input the security code through a keyboard, the security code automatically inputs to carry out a security code verify operation.

Figure 6:
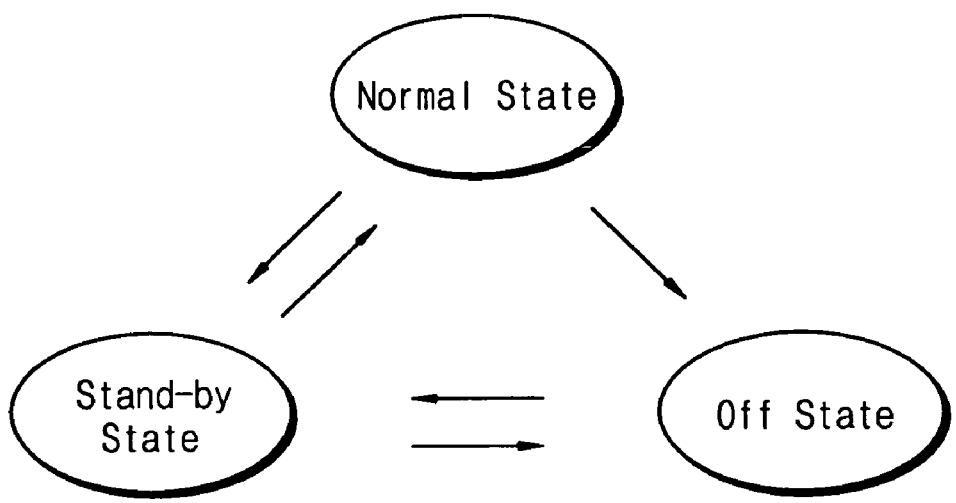
FIG. 6 is a state view showing transitions of power states of a computer system with a power management function.

A state view showing transitions of power states of a computer system having a power management function is shown in FIG. 6. The power states are classified into a normal state, a stand-by state, and an off state.

For example, when the computer system 200 is in the off state, if a power is applied by a remote control signal transmitted from the remote controller 300 or a power switch 210 mounted upon a body of the computer system 200, the computer system 200 is booted and enters the normal state. On the other hand, if the power is shut off by a remote control signal or the power switch, a power state of the computer system 200 is converted into the off state from the normal state.

When the computer system 200 is in the normal state, if the remote control signal is transmitted from the remote controller 300 to the remote control signal receiver 400, the computer system 200 enters the stand-by state. Alternatively, if data does not input from a data input device such as the keyboard 100 for a predetermined time, the power state of the computer system 200 is converted into the stand-by state from the normal state by the power management function.

On the other hand, when the computer system 200 is in the stand-by state, if data inputs from one of the data input devices such as the mouse 110 or the remote controller 300, the power state thereof is converted into the normal state from the stand-by state.

As described above, if a security code is set in a computer system and a function to verify the security code is provided to the system in existing from a stand-by state to a normal state, power-state transition of the system will be performed as follows. A user password or security code is commonly stored in EEPROM 320 of the remote controller 300 and in EEPROM 420 of computer system 200. When a user presses a key (e.g., power key) of the remote controller in order to bring the computer from stand-by mode to normal mode, the security code stored in the EEPROM 320 within the remote controller 300 is automatically transmitted through the remote control signal transmitting circuit 330 to the computer system. Remote control receiver 400 receives the security code from the remote controller 300, checks whether or not the received code is identical with the security code stored in its EEPROM 420, and, if so, resumes the computer system so that the computer enters the normal mode from the stand-by mode. Like this, the computer system of the invention can be converted from its stand-by mode into its normal mode by use of an authorized remote controller(s). If transition to a normal state is performed by an input of the remote controller 300, the shell program 293 directly transmits the security code verify function, which is transmitted from the remote controller 300, to the OS program 295. Thus, after performing a security code verify operation on the basis of this security code, the OS program 295 returns the power state of the system to the normal state. All operations of these sequential steps are automatically performed by control of the shell program 293 without manipulation except the remote controller 300.

If transition to the normal state is performed not by the remote controller 300 but by another input device, the OS program 295 displays a message saying "input a security code" on a screen of a monitor 120. In this case, a user directly inputs a security code using the keyboard 100. Then the OS program 295 checks whether the input security code is matched with the preset security code. If matched, the power state returns to the normal state.

Figure 7:
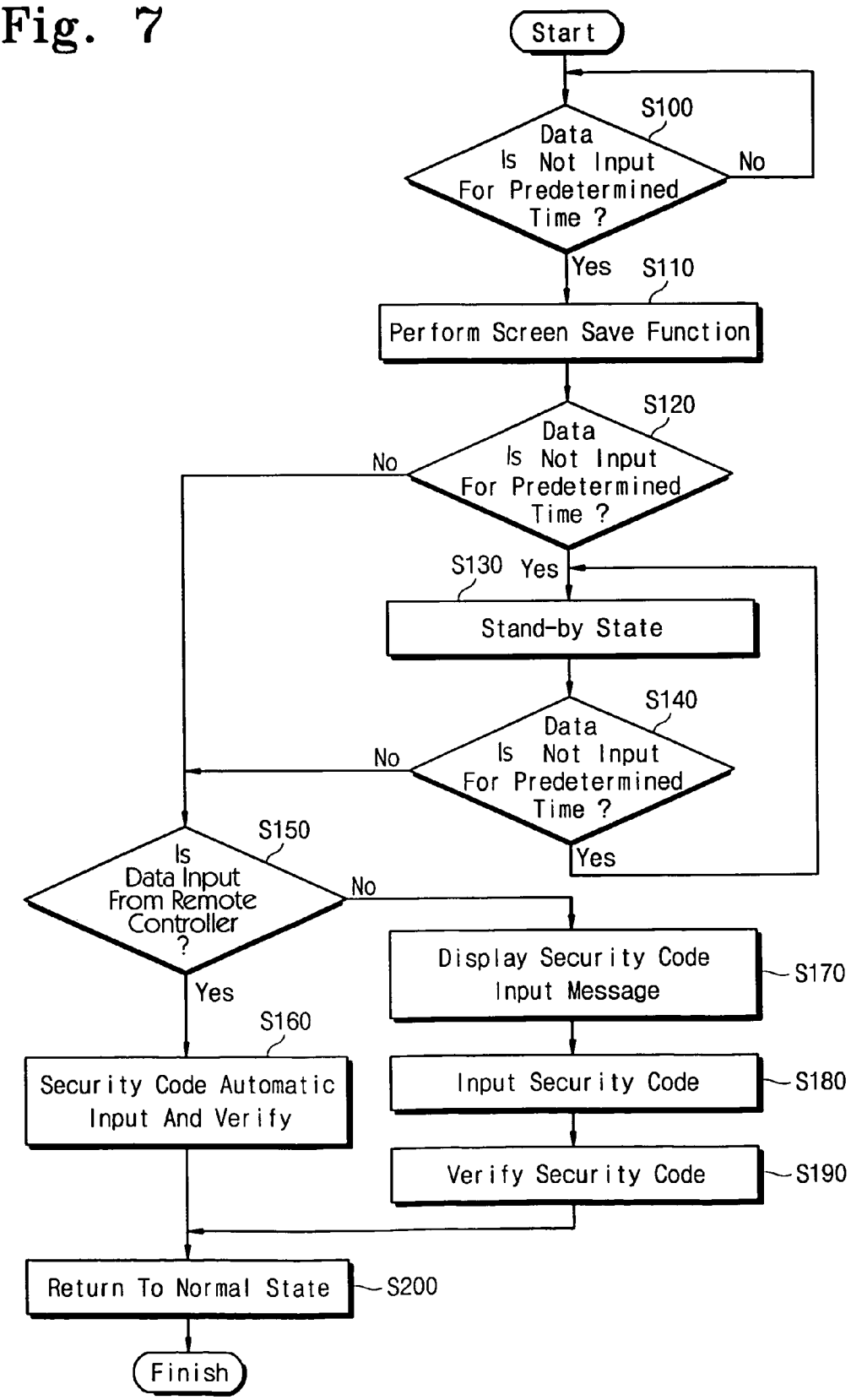
FIG. 7 is a flowchart showing the steps of verifying a security code when the computer system returns from a stand-by state to a normal state in accordance with the first embodiment of the invention.

When a power state of a computer system returns from a stand-by state to a normal state, a security code verify operation flow is illustrated in FIG. 7. In step S100, it is checked whether data is input within a predetermined time. If data is not input, step S100 proceeds to step S100 wherein a screen save function that an OS program supports is performed.

In step S120, it is checked once again whether data is input within a predetermined time. If data is not input, step S120 proceeds to step S130 wherein the power state is converted into a stand-by state. If data is input, step S120 proceeds to step S150 wherein it is checked whether the data is input from a remote controller. If the data is input from the remote controller, step S150 proceeds to step S160 wherein a security code automatic input and verification function is performed. This is achieved by making the shell program transmit the security code, which is input from the remote controller, to the OS program. If the function is finished in step S160, the power state returns to the normal state in step S200. If it is determined in step S150 that the data is not input via the remote controller, the control passes to step S170 where the display asks for input of the security code, step S180 where the user inputs the security code (usually via a keyboard) and step S190 where the input security code is compared with an internal security code. If the function is finished in step S190, the power state returns to the normal state in step S200.

After the power state of the computer system is converted into the stand-by state in step S130, step S130 proceeds to step S140 wherein it is checked once more whether the data is input within a predetermined time period. If the data is not input, step S140 returns to step S130 wherein the power state remains in the stand-by state. If the is data input, step S140 proceeds to step S150 wherein the foregoing step of verifying the security code according to a type of the input device is performed.

As described above, if the power state of the computer system is converted into the normal state from the stand-by state by the remote controller, the shell program automatically inputs the security code, which is transmitted from the remote controller, to the OS program. Thus, although a user does not input a security code using a keyboard, an automatic security code verification function is performed to enable the user to perform the steps of verifying the security code more conveniently.

Second Embodiment

Now, a second embodiment of the present invention will be described in, for example, a multi-user computer system hereinafter. According to the second embodiment, a multi-user system automatically performs a security code verification operation when a computer system goes from a stand-by state to a normal state by operation of a remote controller. Therefore, a security code input operation that a user must input using an input device such as a keyboard is automatically performed to enhance convenience of the user.

Figure 8:
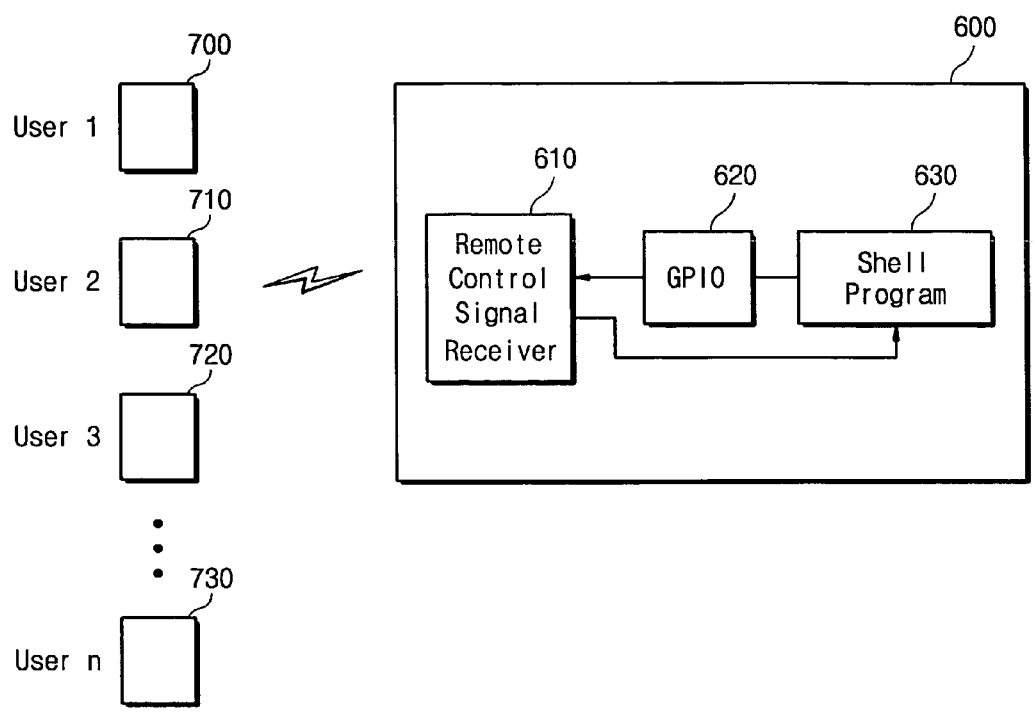
FIG. 8 is a block diagram showing a construction of a multi-user computer system in accordance with a second embodiment of the present invention.

A construction of a multi-user computer system according to the second embodiment of the invention is schematically shown in FIG. 8. A multi-user system 600 cordlessly accesses to a plurality of remote controller 700, 710, 720, and 730. A plurality of users can remotely control the system 600 using their remote controllers 700, 710, 720, and 730, respectively. The system 600 includes a remote control signal receiver 610, a GPIO 620, and a shell program 630. Basic operations to process an input of a remote control signal in the computer system 600 according to the second embodiment are identical to those in the computer system according to the first embodiment. Similar to the first embodiment, the remote control signal receiver 610 is composed of a microcontroller, an EEPROM, and remote control signal receiving circuits. Each password of multi-users is stored in the EEPROM, and is used to verify a password during inputting the remote control signal. As a difference between the first and second embodiments, a method for processing an input of a remote control signal that inputs from a plurality of users will now be described more fully hereinafter.

Figure 9:
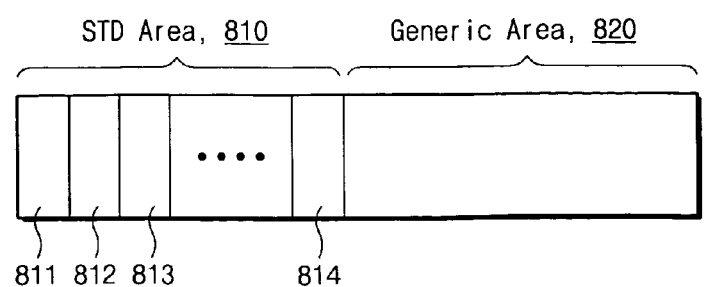
FIG. 9 shows a memory area of a hard disk in the multi-user computer system shown in FIG. 8.

A memory area 800 of a hard disk in the multi-user computer system 600 is shown in FIG. 9. The memory area 800 is classified into a save-to-disk (STD) area 810 and a generic area 820. When the system 600 is in the STD, contents of a main memory are stored in the STD area 810. The STD area 810 is divided into a plurality of areas 811, 812, 813, and 814 whose sizes are equal to each other. The number of the area 811, 812, 813, and 814 corresponds to that of the multi-users. The generic area 820 is a generic hard disk storage area in which an operating system, application programs, data, etc. are stored.

Figure 10:
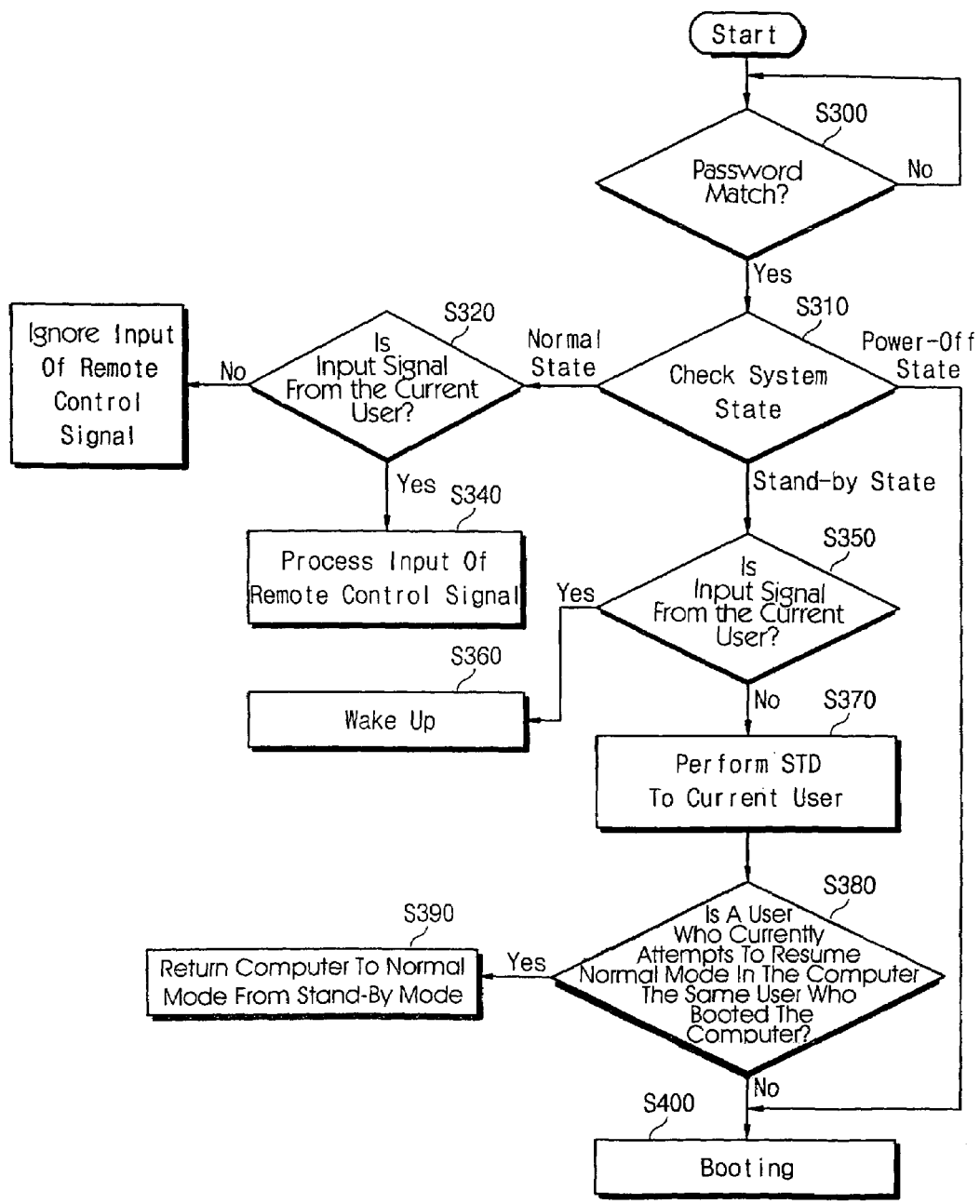
FIG. 10 is a flowchart showing the steps of verifying a security code of the multi-user computer system shown in FIG. 8.

A security code verification flow of the multi-user system 600 is shown in FIG. 10. Security code verification operations are controlled by a microcontroller embedded in a remote control signal receiver 610. If a remote control signal is received from remote controllers 700, 710, 720, and 730, it is checked whether a password match occurs in step S300. In other words, whether a user's password registered in the received remote control signal is checked. If the received remote control is signal input from a registered user, a system state is checked in step S310. If the system state is a normal state, step S310 proceeds to step S320 wherein it is checked whether the received remote control signal is input from a current user. If the remote control signal is not input from a current user, step S320 proceeds to step S330 wherein the input of the remote control signal is ignored. If the remote control signal is input from a current user, step S320 proceeds to step S340 wherein a process corresponding to the remote control signal is performed.

If the system state is in the stand-by state, step S310 proceeds to step S350 wherein it is checked whether the input signal is coming from the current user. If the input signal is coming from the current user, step S350 proceeds to step S360 wherein the system is woke up. If the input signal is not coming from the current user, step S350 proceeds to step S370 wherein a save-to-disk (STD) is performed to the current user. In step S380, it is checked whether a remote control signal input to a computer comes from the same remote control that booted the computer in the first place. If the remote controls are the same, step S380 proceeds to step S390 wherein the computer is returned to normal mode from stand-by mode. If the remote control in use is different from the one used to boot the computer, step S380 proceeds to step S400 wherein the system is normally booted.

If the system is in a power-off state, step S310 proceeds directly to step S400 wherein the system is powered on and booted. Similar to the first embodiment, a procedure of checking a password in steps S360, S390, and S400 automatically inputs. Therefore, a user does not have to perform a procedure of inputting a password.

As described so far, when operations are controlled by a remote controller in a single-user or a multi-user computer system, a method of verifying a security code can be more simplified. And, a user does not have to input a password in person.

The invention has been described and its operation detailed. When a person skilled in the art reads the foregoing description, alternatives and equivalents within the spirit and intent of the invention will be apparent. Accordingly, it is intended that the scope of the invention be limited by he claims that follows.

What is claimed is:

1. A method of operating a computer, the method comprising:
   pressing a button on an input device;
   determining whether the input device is a wireless remote controller;
   automatically transmitting a first security code stored in the input device to the computer when the input device is a wireless remote controller;
   requiring manual input of the first security code when said input device is not a wireless remote controller;
   checking whether a second security code stored within the computer is the same as the first security code; and
   automatically converting an operation mode of the computer from a non-normal, non-power off mode into a normal mode when the first security code is the same as the second security code.

2. The method of claim 1, wherein said computer comprises an operating system (OS) program to perform said checking step.

3. The method of claim 1, wherein the computer is in a standby mode immediately prior to said conversion to said normal state, said standby mode being a power saving state where an amount of power delivered to the computer is less than normal but greater than zero, said standby mode being said non-normal, non-power off mode.

4. The method of claim 1, wherein the computer is in a screen saver mode immediately prior to said conversion to said normal mode, said screen saver mode being said non normal non power off mode.

5. The method of claim 1, said automatically transmitting said first security code to said computer occurring when just one button has been pressed on said wireless remote controller.

6. The method of claim 1, the remote controller being a wireless hand held remote controller.

7. A method for automatically verifying a security code of a multi-user computer via one of a plurality of cordless remote controllers, the method comprising the steps of:
   operating a remote control device, the remote control device being one of said plurality of remote controllers, to turn on and boot said computer;
   waiting a predetermined period of time for said computer to lapse into a stand-by mode;
   pushing a button on one of said plurality of remote controllers to attempt to bring said computer to a normal mode;
   transmitting a password to said computer from said remote control device that attempted to bring said computer back to a normal mode;
   determining whether the remote controller used to attempt to bring said computer to a normal mode is the same remote control device that booted said computer;
   bringing said computer back to a normal mode if said remote control device used to bring the computer back to a normal mode is the same remote control device used to boot the computer; and
   rebooting said computer and repeating all of the above steps if the remote control device used to bring said computer to a normal mode is different from the remote control device used to boot the computer.

8. The method of claim 7, further comprising the steps of:
   transmitting to said computer from said one of said plurality of remote controllers a password unique to said remote controller when said computer is booted;
   saving said password of said remote controller to disk in said computer for future use; and
   comparing a password transmitted to said computer by said remote controller that is attempting to resume said computer to a normal mode with said password stored in said disk to determine whether the remote controller used to attempt to resume said computer to a normal mode is the same remote controller used to boot said computer.

9. The method of claim 8, wherein the multi-user computer includes a plurality of save-to-disk storage areas for each one of said plurality of remote controllers.

* * * * *